United States Patent
Kleine Wächter et al.

(10) Patent No.: US 12,446,621 B2
(45) Date of Patent: Oct. 21, 2025

(54) EVAPORATOR TANK UNIT FOR AN INHALER, PREFERABLY AN ELECTRONIC CIGARETTE PRODUCT, ELECTRONIC CIGARETTE PRODUCT AND WICK STRUCTURE

(71) Applicant: KÖRBER TECHNOLOGIES GMBH, Hamburg (DE)

(72) Inventors: Michael Kleine Wächter, Lankau (DE); Thomas Müller, Hamburg (DE); Lennart Kock, Hamburg (DE)

(73) Assignee: KÖRBER TECHNOLOGIES GMBH, Hamburg (DE)

( * ) Notice: Subject to any disclaimer, the term of this patent is extended or adjusted under 35 U.S.C. 154(b) by 579 days.

(21) Appl. No.: 17/430,933

(22) PCT Filed: Feb. 11, 2020

(86) PCT No.: PCT/EP2020/053404
§ 371 (c)(1),
(2) Date: Aug. 13, 2021

(87) PCT Pub. No.: WO2020/165131
PCT Pub. Date: Aug. 20, 2020

(65) Prior Publication Data
US 2022/0117302 A1    Apr. 21, 2022

(30) Foreign Application Priority Data
Feb. 15, 2019 (DE) .................. 10 2019 202 046.1

(51) Int. Cl.
*A24F 40/44*    (2020.01)
*A24F 40/42*    (2020.01)

(52) U.S. Cl.
CPC .............. *A24F 40/44* (2020.01); *A24F 40/42* (2020.01)

(58) Field of Classification Search
None
See application file for complete search history.

(56) References Cited

U.S. PATENT DOCUMENTS

2002/0086253 A1   7/2002   Young et al.
2009/0272379 A1   11/2009  Thorens et al.
(Continued)

FOREIGN PATENT DOCUMENTS

CN         102014677 A        4/2011
DE    10 2017 111 119 A1    11/2018
(Continued)

OTHER PUBLICATIONS

Opposition filed with the European Patent Office dated Apr. 19, 2024 in parallel European Patent No. 3 923 752.
(Continued)

*Primary Examiner* — Jennifer A Boyd
(74) *Attorney, Agent, or Firm* — SALIWANCHIK, LLOYD & EISENSCHENK

(57) ABSTRACT

A vaporizer tank unit for an inhaler, preferably an electronic cigarette product comprises at least an electric vaporizer for vaporizing liquid fed to the vaporizer, a liquid reservoir for storing liquid, and a capillary wick structure, wherein the liquid is feedable by capillary forces from the liquid reservoir to an inlet side of the vaporizer. The wick structure is one-piece and contacts and/or forms the liquid reservoir over at least one circumferential section.

19 Claims, 5 Drawing Sheets

(56) References Cited

U.S. PATENT DOCUMENTS

| | | |
|---|---|---|
| 2010/0200006 A1 | 8/2010 | Robinson et al. |
| 2013/0228191 A1 | 9/2013 | Newton |
| 2014/0246018 A1 | 9/2014 | Terry et al. |
| 2015/0034108 A1 | 2/2015 | Newton |
| 2015/0230522 A1 | 8/2015 | Horn et al. |
| 2016/0073692 A1 | 3/2016 | Alarcon et al. |
| 2017/0105455 A1 | 4/2017 | Qiu |
| 2017/0188626 A1* | 7/2017 | Davis ............... A24F 40/40 |
| 2017/0290370 A1 | 10/2017 | Garthaffner et al. |
| 2017/0325505 A1 | 11/2017 | Force et al. |
| 2017/0360092 A1* | 12/2017 | Althorpe ............... A61M 15/06 |
| 2017/0367411 A1* | 12/2017 | Duc ............... A24F 40/44 |
| 2018/0020723 A1* | 1/2018 | Davis ............... B65D 83/265 392/404 |
| 2018/0059780 A1 | 3/2018 | Mitchell et al. |
| 2018/0360116 A1 | 12/2018 | Schmidt et al. |
| 2019/0246696 A1* | 8/2019 | Schmidt ............... A61M 15/06 |
| 2021/0360971 A1 | 11/2021 | Lipowicz et al. |

FOREIGN PATENT DOCUMENTS

| | | |
|---|---|---|
| EP | 3 864 979 A1 | 1/2016 |
| EP | 3 407 677 A1 | 11/2018 |
| WO | WO 2015/031336 A1 | 3/2015 |
| WO | WO 2016/096780 A1 | 6/2016 |
| WO | WO 2018/083007 A1 | 5/2018 |
| WO | WO 2018/167066 A1 | 9/2018 |

OTHER PUBLICATIONS

First Examination Report issued by the German Patent and Trademark Office on Oct. 28, 2019 with respect to the German priority application No. 10 2019 202 046.1.

Examination Report issued by the Chinese Patent Office dated Sep. 26, 2024, in the parallel Chinese patent application No. 202080014283.9.

* cited by examiner

EVAPORATOR TANK UNIT FOR AN INHALER, PREFERABLY AN ELECTRONIC CIGARETTE PRODUCT, ELECTRONIC CIGARETTE PRODUCT AND WICK STRUCTURE

CROSS REFERENCE TO RELATED APPLICATIONS

This application is a National Stage Application of International Application Number PCT/EP2020/053404, filed Feb. 11, 2020; which claims priority to German Patent Application No. 10 2019 202 046.1, filed Feb. 15, 2019.

FIELD OF INVENTION

The present invention relates to a vaporizer tank unit for an inhaler, preferably an electronic cigarette product, comprising at least one electric vaporizer for vaporizing liquid fed to the vaporizer, a liquid reservoir for storing liquid, and a capillary wick structure, wherein the liquid is feedable by capillary forces from the liquid reservoir to an inlet side of the vaporizer. The invention also relates to an inhaler, preferably an electronic cigarette product, and a wick structure.

BACKGROUND OF THE INVENTION

Conventional electronic cigarette products or inhalers are based on the wick-coil technology. Capillary forces transport the liquid from the liquid reservoir along a wick until the liquid is heated by an electrically heated coil and thus vaporized. The wick serves as a liquid-conducting connection between the liquid reservoir and the heating coil, which serves as the vaporizer.

A disadvantage of the wick-coil technology is that an insufficient supply of liquid leads to local overheating, which can generate pollutants. This so-called "dry puff" must be avoided. In addition, such vaporizer units are often leaky due to the manufacturing process, so that liquid can escape in an undesirable manner, for example via the air supply and/or vapor outlet.

To avoid the problems of wick-coil technology, generic vaporizers are used that utilize of the technology disclosed in DE 10 2017 111 119 A1. Thereby, the liquid is transported by capillary forces from the wick structure out of the liquid reservoir to the inlet side of the vaporizer, where the liquid is vaporized and vaporized liquid can be added as vapor and/or aerosol to an air stream.

Typically, in the prior art, a cylindrical wick structure is provided which, on the one hand, contacts the inlet side and, on the other hand, protrudes with an inlet end into the volume of the liquid reservoir.

However, when the liquid reservoir is no longer completely filled, depending on the orientation of the inhaler, there may be a lack of liquid at the inlet end of the wick structure, which leads to an interruption in the feed of liquid to the vaporizer.

Therefore, a voluminous sponge, absorbent cotton or the like is usually placed adjacent to the inlet end of the wick structure as an intermediate reservoir of a certain transitional supply amount of liquid into the liquid reservoir. The sponge acts as a capillary intermediate reservoir or intermediate conductor for liquid, so that the vaporizer can be fed with liquid uninterruptedly, irrespective of position and/or orientation and largely independent of the filling level.

The insertion of a sponge is technically complex and can easily lead to insufficient liquid conduction between the sponge and the wick structure due to insufficiently precise assembly, which is caused, for example, by the sponge not making sufficient contact with the wick structure. The requirements for the dimensions of the fluid reservoir and the sponge and their assembly are thus high.

BRIEF SUMMARY OF THE INVENTION

It is the task of the invention to provide a vaporizer tank unit that enables an effective, reliable feed of liquid to the vaporizer that is independent of the orientation and/or level of the liquid reservoir.

The task is solved by the features of the independent claims. According to the invention, it is proposed that the wick structure is one-piece and contacts and/or forms the liquid reservoir over at least one circumferential section.

The one-piece wick structure avoids additional contact between a prior art sponge and a wick. The one-piece wick has only one contact with the inlet side of the vaporizer. A liquid-conducting contact between the inlet side of the vaporizer and the wick structure can be reliably established without, for example, creating bubbles or cavities.

The contacting and/or forming of the circumferential section has the effect that the wick structure can receive and intermediately store liquid from a region of the liquid reservoir, even if the liquid reservoir is almost empty and the liquid temporarily moves away from the circumferential section of the wick structure due to gravity, since the liquid once received is no longer released from the wick structure into the liquid reservoir. It is therefore sufficient for sufficient intermediate storage if liquid "sloshes" against the wick structure once in a while and/or the wick structure can be immersed in the liquid. The wick structure may contact the circumferential section of the fluid reservoir by extending the wick structure to the circumferential section, i.e., the wick structure extends into the fluid reservoir. The wick structure may even form the fluid reservoir more expansively, in which the wick structure occupies further portions of the fluid reservoir.

Preferably, the wick structure contacts the liquid reservoir along an inner surface of an outer wall of the liquid reservoir so that the wick structure can hold the liquid until the liquid reservoir is completely empty. The wick structure may contact the inner surface of the outer wall by means of an interference fit. Alternatively, however, a gap may be provided defining a minimum distance between the inner surface and the wick structure to facilitate the assembly of the wick structure.

Preferably, the fluid reservoir comprises a longitudinal axis and the wick structure extends radially in at least two diametrical directions perpendicular to the longitudinal axis to allow the wick structure to receive the fluid independently of the orientation of the fluid reservoir, in particular independently of the rotation of the fluid reservoir about the longitudinal axis of the fluid reservoir.

Preferably, an air channel extending through the liquid reservoir is provided in the liquid reservoir to enable an effective setup of the vaporizer tank unit.

In an advantageous embodiment, the wick structure comprises a plurality of diverging and/or opposing wick sections contacting different circumferential sections to allow the wick structure to receive the liquid regardless of the orientation of the liquid reservoir. This allows contact with the liquid in opposing sections of the liquid reservoir and further prevents the wick structure and the vaporizer from running dry.

Advantageously, the wick structure comprises a U-shaped cross-section having an apex and is arranged such that the wick structure contacts the inlet side at its apex for effective setup and ease of assembly of the vaporizer tank unit.

Advantageously, the circumferential section comprises at least one angle of 45°, further advantageously at least 90°, particularly advantageously at least 180°, for example 270° and up to 360°, in order to favor an orientation- and fill-level-independent feed of liquid to the wick structure. The circumferential section can be continuous or formed from several separate subsections. For example, two or more circumferential sections, in particular evenly distributed in the circumferential direction, can be contacted and/or formed. In particular, two circumferential sections can be provided, each with an angle of 90°, but spaced apart from each other, for example diametrically oppositely arranged.

Preferably, the wick structure comprises a mechanical retainer for retaining the vaporizer and/or a carrier.

Preferably, the wick structure is at least partially hollow-cylindrical in shape to advantageously contact and/or form the circumferential surface of a cylindrical fluid reservoir. Liquid may be storable in the hollow space. The hollow space may form a major part of the volume of the fluid reservoir, for example at least 50%, preferably at least 70% and further preferably at least 90%.

Advantageously, the wick structure forms the fluid reservoir at least partially. Thus, the fluid reservoir can be multi-part, wherein the wick structure can form, for example, a cylindrical section of the fluid reservoir. Other sections of the fluid reservoir may be formed by a polymer, for example. Different sections of the fluid reservoir may, for example, be glued and/or connected to each other with mechanical elements such as catches, lugs or clips.

Preferably, the wick structure forms an outer wall of the liquid reservoir to ensure a simple structure of the vaporizer-tank-unit, and at the same time to favor an orientation- and fill-level-independent liquid supply to the wick structure.

Preferably, the wick structure extends from the electric vaporizer into the liquid reservoir and comprises a pore volume per pore that increases with distance from the vaporizer, so that optimum liquid feed to the vaporizer and at the same time buffer storage of liquid in the wick structure is advantageously achieved.

Advantageously, the wick structure comprises a storage section and a feed section, and the volume of the storage section in the liquid reservoir is greater than the volume of the feed section adjacent to the vaporizer to allow the wick structure to protrude into the liquid reservoir into regions remote from the vaporizer while providing a preferred buffering effect for intermediate storage of liquid.

Preferably, the wick structure comprises a painted, coated and/or liquid-tight surface to be able to form a circumferential section of the liquid reservoir that is sealed and impermeable to liquid. This ensures that the wick structure can form or replace the outer wall of the liquid reservoir.

Preferably, the wick structure consists of a porous glass. In contrast to the prior art, the wick structure advantageously does not consist of a plurality of fibers between which cavities are formed for fluid transport and fluid conduction. Instead, the wick structure comprises a porous solid body. This can consist of porous ceramic, but preferably of porous glass. In particular, consisting of a borosilicate glass or other oxide glass. The blanks of the wick structure can be effectively produced with a press tool. This means that a wide variety of spatial shapes or geometries are conceivable, wherein an air channel, in particular one extending axially, can preferably be provided inside an outer wall of the liquid reservoir inside the liquid reservoir. By pressing, the pore size and the distribution of the pores of the wick structure can be adjusted. In particular, a pore gradient and/or pore size gradient can be adjusted, wherein the pore size decreases from the liquid reservoir towards the vaporizer. For example, the pore size can comprise a diameter of 0 to 500 µm, preferably from 10 nm to 100 µm. The use of a pressed glass for the wick structure makes it easier to manufacture and handle than, for example, prior art ceramic wick structures. The wick structure can also be made of a composite of porous materials and include, for example, portions of porous glass and portions of ceramics. The wick structure made of glass is particularly chemically inert and temperature stable, which is particularly advantageous in contact with the vaporizer.

Advantageously, the wick structure is colored and is visible from the outside in order to be able to observe the filling level of the liquid reservoir and to increase the visual value of the vaporizer tank unit. For this purpose, the wick structure can be arranged inside a transparent housing of the liquid reservoir. Alternatively, the wick structure may form the liquid storage tank or housing and be directly visible from the outside.

According to the invention, a wick structure for an inhaler, in particular an electronic cigarette product, is a one-piece structure and is made of a porous glass in order to provide a wick structure that can be manufactured in a particularly effective and versatile manner.

BRIEF DESCRIPTION OF THE FIGURES

The invention is explained below by means of preferred embodiments with reference to the accompanying figures. Thereby shows FIG. 1 a schematic view of an inhaler.

DETAILED DESCRIPTION

Figure 1:
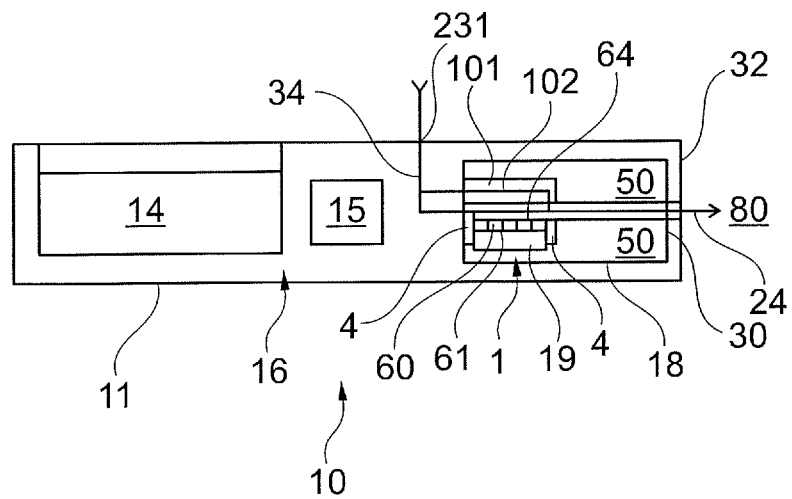

FIG. 1 schematically shows an inhaler 10 respectively an electronic cigarette product. The inhaler 10 comprises a housing 11 in which an air channel 30 or vent is provided between at least one air inlet opening 231 and an air outlet opening 24 at a mouth end 32 of the cigarette product 10. The mouth end 32 of the inhaler 10 thereby denotes the end at which the consumer draws for the purpose of inhalation, thereby applying a negative pressure to the inhaler 10 and generating an air flow 34 in the air channel 30.

The inhaler 10 advantageously comprises a base part 16 and vaporizer tank unit 1, which comprises a vaporizer 60 and a liquid reservoir 18, and in particular may be in the form of a replaceable cartridge. The liquid reservoir 18 may be refillable by the user of the inhaler 10. The air drawn through the air inlet opening 231 is directed in the air channel 30 to the at least one vaporizer 60. The vaporizer 60 is connected or connectable to the liquid reservoir 18, in which at least one liquid 50 is stored. For this purpose, a porous and/or capillary liquid-conducting wick structure 19 is advantageously arranged at an inlet side 61 of the vaporizer 60.

The vaporizer 60 vaporizes liquid 50, which is fed to the vaporizer 60 from the liquid reservoir 18 by the wick structure 19 by means of capillary forces, and adds the vaporized liquid as an aerosol/vapor to the air stream 34 at an outlet side 64.

The electronic cigarette 10 further comprises an electrical energy storage device 14 and an electronic control device 15. The energy storage device 14 is generally arranged in the base part 16 and in particular may be a disposable electrochemical battery or a rechargeable electrochemical battery, for example a lithium-ion battery. The vaporizer tank unit 1 is arranged between the energy storage device 14 and the mouth end 32. The electronic control device 15 comprises at least one digital data processing device, in particular microprocessor and/or microcontroller, in the base part 16 (as shown in FIG. 1) and/or in the vaporizer tank unit 1.

Advantageously, a sensor, for example a pressure sensor or a pressure or flow switch, is arranged in the housing 11, wherein the control device 15 can determine, based on a sensor signal output by the sensor, that a consumer is drawing on the mouth end 32 of the cigarette product 10 to inhale. In this case, the control device 15 controls the vaporizer 60 to add liquid 50 from the liquid reservoir 18 as an aerosol/vapor into the air stream 34.

The at least one vaporizer 60 is arranged in a part of the vaporizer tank unit 1 facing away from the mouth end 32. This allows for effective electrical coupling and control of the vaporizer 60. Advantageously, the air flow 34 passes through an air channel 30 extending axially through the liquid reservoir 18 to the air outlet opening 24.

The liquid 50 stored in the liquid reservoir 18 to be dispensed is, for example, a mixture of 1,2-propylene glycol, glycerol, water, at least one aroma (flavor) and/or at least one active ingredient, in particular nicotine. However, the indicated components of the liquid 50 are not mandatory. In particular, flavoring and/or active ingredients, in particular nicotine, may be omitted.

The vaporizer tank unit 1 or cartridge or the base part 16 advantageously comprise a non-volatile data memory for storing information or parameters relating to the vaporizer tank unit 1 or cartridge. The data memory may be part of the electronic control device 15. The data memory advantageously stores information on the composition of the liquid stored in the liquid reservoir 18, information on the process profile, in particular power/temperature control; data on condition monitoring or system testing, for example leak testing; data relating to copy protection and counterfeit protection, an ID for unambiguous identification of the vaporizer tank unit 1 or cartridge, serial number, date of manufacture and/or expiration date, and/or number of puffs (number of inhalation puffs by the consumer) or the time of use. The data memory is advantageously electrically connected or connectable to the control device 15.

In the inhaler 10 and/or in an external memory which can be connected, at least temporarily, to the inhaler 10 by communication technology in a suitable and per se known manner, user-related data, in particular about smoking behavior, could also be stored and preferably also used for controlling and regulating the inhaler.

Additional channels, in particular at least one secondary air channel 101, which meet the air channel 30 downstream of the vaporizer 60, can provide for mixing of the gas/aerosol mixture with fresh air from a secondary air stream 102 and/or control processes of post-treatment and/or recondensation.

Figure 2:
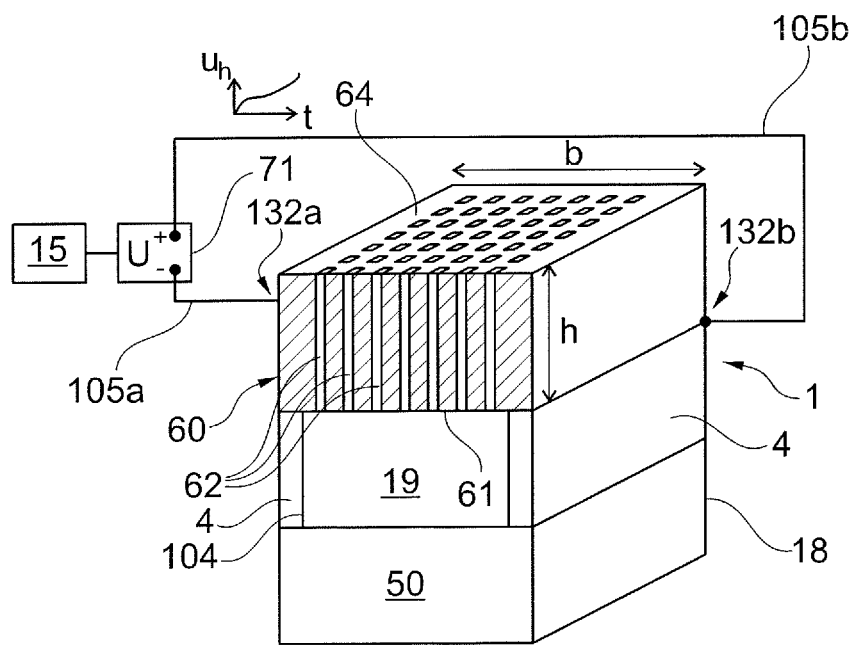
FIG. 2 a perspective sectional view through a vaporizer and schematically a vaporizer tank unit.

FIG. 2 shows a perspective sectional view of a vaporizer 60 and schematically a vaporizer tank unit 1.

The vaporizer tank unit 1 comprises a block-shaped, preferably monolithic heating body or vaporizer 60 preferably made of an electrically conductive material, in particular a semiconductor material preferably silicon. It is not necessary that the entire vaporizer 60 is made of an electrically conductive material. It may be sufficient, for example, that the surface of the vaporizer 60 is electrically conductive, for example metallic, coated or preferably suitably doped. In this case, the entire surface need not be coated, for example metallic or preferably non-metallic or non-metallically laminated metallic conductor tracks can be provided on a non-conductive or semi-conductive base body. It is also not essential that the entire vaporizer 60 heats; for example, it may be sufficient if a portion or a heating layer of the vaporizer 60 heats in the region of the outlet side 64.

The vaporizer 60 is provided with a plurality of microchannels, or liquid channels, 62 that liquidly connect an inlet side 61 of the vaporizer 60 to an outlet side 64 of the vaporizer 60.

The average diameter of the liquid channels 62 is preferably in the range between 5 μm and 200 μm, further preferably in the range between 30 μm and 150 μm, still further preferably in the range between 50 μm and 100 μm. Due to these dimensions, a capillary effect is advantageously created so that liquid entering a liquid channel 62 at the inlet side 61 rises upward through the liquid channel 62 until the liquid channel 62 is filled with liquid. The volume ratio of liquid channels 62 to vaporizer 60, which may be referred to as the porosity of vaporizer 60, is for example in the range between 10% and 50%, advantageously in the range between 15% and 40%, still further advantageously in the range between 20% and 30%, and is for example 25%.

The edge lengths of the surfaces of the vaporizer 60 provided with liquid channels 62 are for example in the range between 0.5 mm and 3 mm, preferably between 0.5 mm and 1 mm. The dimensions of the surfaces of the vaporizer 60 provided with liquid channels 62 may be, for example: 0.95 mm×1.75 mm or 1.9 mm×1.75 mm or 1.9 mm×0.75 mm. The edge lengths of the vaporizer 60 may be, for example, in the range between 0.5 mm and 5 mm, preferably in the range between 0.75 mm and 4 mm, further preferably in the range between 1 mm and 3 mm. The area of the vaporizer 60 (chip size) may be, for example, 1 mm×3 mm, 2 mm×2 mm or 2 mm×3 mm.

The width b of the vaporizer 60 (see FIG. 2) is preferably in the range between 1 mm and 5 mm, further preferably in the range between 2 mm and 4 mm, and is for example 3 mm. The height h of the vaporizer 60 (see FIG. 2) is preferably in the range between 0.05 mm and 1 mm, further preferably in the range between 0.1 mm and 0.75 mm, still further preferably in the range between 0.2 mm and 0.5 mm, and is for example 0.3 mm. Even smaller vaporizers 60 can also be manufactured, provided and functionally operated.

The number of liquid channels 62 preferably ranges between four and 1000. In this way, the heat input into the liquid channels 62 can be optimized and a guaranteed high vaporization performance as well as a sufficiently large vapor outlet area can be realized.

The liquid channels 62 are arranged in the form of a square, rectangular, polygonal, round, oval or otherwise shaped array. The array may be in the form of a matrix with s columns and z rows, wherein s is advantageously in the range between 2 and 50 and further advantageously in the range between 3 and 30 and/or z is advantageously in the range between 2 and 50 and further advantageously in the range between 3 and 30. In this way, an effective and easily producible arrangement of the liquid channels 62 with secured high vaporization performance can be realized.

The cross-section of the liquid channels 62 may be square, rectangular, polygonal, round, oval or otherwise shaped, and/or may change section-wise in the longitudinal direction, in particular increase, decrease or remain constant.

The length of one or each fluid channel 62 is preferably in the range between 100 μm and 1000 μm, further preferably in the range between 150 μm and 750 μm, still further preferably in the range between 180 μm and 500 μm and is for example 300 μm. In this way, optimum liquid reception and portion formation can be achieved with sufficiently good heat input from the vaporizer 60 into the liquid channels 62.

The distance between two liquid channels 62 is preferably at least 1.3 times the clear diameter of a liquid channel 62, wherein the distance is related to the center axes of the two liquid channels 62. The distance can preferably be 1.5 to 5 times, more preferably 2 to 4 times, the clear diameter of a liquid channel 62. In this way, an optimal heat input into the vaporizer 60 and a sufficiently stable arrangement and wall thickness of the liquid channels 62 can be realized.

Based on the features described above, the vaporizer 60 may also be referred to as a volume heater.

The vaporizer tank unit 1 comprises a carrier 4 having a passage opening 104 for liquid-conducting connection of the vaporizer 60 and a liquid reservoir 18, for which purpose a wick structure 19 is arranged in the passage opening 104.

The inlet side 61 of the vaporizer 60 is connected to the liquid reservoir 18 via the wick structure 19 in a liquid-conducting manner. The wick structure 19 is used to passively feed liquid 50 from the liquid reservoir 18 to the vaporizer 60 by capillary forces. The wick structure 19 advantageously contacts the inlet side 61 of the vaporizer 60 in a planar manner and covers all liquid channels 62 of the vaporizer 60 on the inlet side. On the side opposite the vaporizer 60, the wick structure 19 is connected to the liquid reservoir 18 in a liquid-conducting manner.

The wick structure 19 consists of porous and/or capillary material which, due to capillary forces, is capable of passively feeding liquid vaporized by the vaporizer 60 from the liquid reservoir 18 to the vaporizer 60 in sufficient quantity to prevent the liquid channels 62 from running dry and resulting problems.

Advantageously, the wick structure 19 comprises an electrically non-conductive material to prevent undesirable heating of fluid in the wick structure 19 by current flow. The wick structure 19 advantageously comprises a low thermal conductivity.

The wick structure 19 advantageously consists of a glass, in particular a pressed borosilicate glass. However, the wick structure 19 may be made of one or more of the materials: cotton, cellulose, acetate, polymer foam, polymer sponge, fiberglass fabric, fiberglass ceramic, sintered ceramic, ceramic paper, aluminosilicate paper, metal foam, metal sponge, another heat-resistant, porous and/or capillary material having a suitable flow rate, or a composite of two or more of the foregoing materials. In one embodiment, the wick structure 19 may comprise at least one of a ceramic fiber paper and/or a porous ceramic.

If the wick structure 19 comprises an electrically and/or thermally conductive material, an insulating layer of an electrically and/or thermally insulating material, for example glass, ceramic or plastic, is advantageously provided between the wick structure 19 and the vaporizer 60, with openings extending through the insulating layer and corresponding to the fluid channels 62.

The volume of the wick structure 19 is preferably in the range between 1 $mm^3$ and 10 $mm^3$, further preferably in the range between 2 $mm^3$ and 8 $mm^3$, still further preferably in the range between 3 $mm^3$ and 7 $mm^3$, and is for example 5 $mm^3$. The volume of the wick structure 19 may be equal to a majority of the volume of the fluid reservoir 18.

The fluid reservoir 18 may be larger in dimension than the wick structure 19. The wick structure 19 may partially form the fluid reservoir 18. For example, the wick structure 19 may be inserted into an opening of a housing of the fluid reservoir 18. A plurality of vaporizers 60 may also be associated with a liquid reservoir 18.

An advantageous volume of the liquid reservoir 18 is in the range between 0.1 ml and 5 ml, preferably between 0.5 ml and 3 ml, further preferably between 0.7 ml and 2 ml or 1.5 ml.

The vaporizer tank unit 1 is preferably connected and/or connectable to a heating voltage source 71 controllable by the control device 15, which is connected to the vaporizer 60 via electrical lines 105a, 105b in a contact area at opposite edge portions 132a, 132b of the vaporizer 60, so that an electrical voltage Uh generated by the heating voltage source 71 results in a current flow through the vaporizer 60. Due to the ohmic resistance of the electrically conductive vaporizer 60, the current flow causes heating of the vaporizer 60 and therefore vaporization of liquid contained in the liquid channels 62. Vapor/aerosol generated in this way escapes to the outlet side 64 from the liquid channels 62 and is mixed with the air flow 34. More specifically, upon detecting an airflow 34 through the air channel 30 caused by drawing of the consumer, the control device 15 controls the heating voltage source 71, wherein the liquid contained in the liquid channels 62 is driven out of the liquid channels 62 in the form of vapor/aerosol by spontaneous heating.

Preferably, a voltage curve Uh(t) adapted to the liquid mixture used is stored in the data memory of the inhaler 10. This makes it possible to preset the voltage curve Uh(t) adapted to the liquid used, so that the heating temperature of the vaporizer 60, and thus also the temperature of the capillary liquid channels 62, can be controlled in time over the vaporization process in accordance with the known vaporization kinetics of the respective liquid, whereby optimum vaporization results can be achieved. The evaporation temperature is preferably in the range between 100° C. and 400° C., further preferably between 150° C. and 350° C., still further preferably between 190° C. and 290° C.

Advantageously, the vaporizer 60 can be made from portions of a wafer with thin film layer technology, which comprises a layer thickness preferably less than or equal to 1000 μm, further preferably 750 μm, still further preferably less than or equal to 500 μm. Surfaces of the vaporizer 60 may advantageously be hydrophilic. The outlet side 64 of the vaporizer 60 may advantageously be microstructured or comprise micro grooves.

The vaporizer tank unit 1 is adjusted to add an amount of liquid preferably in the range between 1 μl and 20 μl, further preferably between 2 μl and 10 μl, even further preferably between 3 μl and 5 μl, typically 4 μl per puff of the consumer.

Preferably, the vaporizer tank unit can be adjustable with respect to the amount of liquid/vapor per puff, i.e. per puff duration from 1 s to 3 s.

In the following, the sequence of the vaporization process is explained by way of example.

In an initial state, the voltage source 71 or the energy storage 14 is switched off for the heating process.

To vaporize liquid 50, the voltage source 14, 71 for the vaporizer 60 is activated. The voltage Uh is set in such a way that the evaporation temperature in the vaporizer 60 and thus in the liquid channels 62 is adapted to the individual vaporization behavior of the liquid mixture used. This prevents the risk of local overheating and thus the formation of pollutants.

In particular, undesirable differential vaporization of a liquid mixture can also be counteracted or avoided. A liquid mixture could otherwise lose components prematurely due to different boiling temperatures in the course of a sequence of vaporization processes, in particular "puffs", before the reservoir 18 of the liquid 50 is completely emptied, which could result in undesirable effects during operation, such as a lack of consistency of dosage for a user, in particular for a pharmaceutically active liquid.

Once an amount of liquid equal to or related to the volume of the liquid channels 62 is vaporized, the heating voltage source 71 is deactivated. Since the liquid properties and quantity are advantageously known exactly and the vaporizer 60 comprises a measurable temperature-dependent resistance, this point in time can be determined or controlled very precisely.

After completion of the heating process, the liquid channels 62 are predominantly or completely drained. The heating voltage 71 is then kept switched off until the liquid channels 62 are filled up again by means of the refeed of liquid through the wick structure 19. As soon as this is the case, the next heating cycle can be started by switching on the heating voltage 71.

The drive frequency of the vaporizer 60 generated by the heating voltage source 71 is generally advantageously in the range of 1 Hz to 50 kHz, preferably in the range of 30 Hz to 30 kHz, even more advantageously in the range of 100 Hz to 25 kHz.

The frequency and duty factor of the heating voltage Uh for the vaporizer 60 are advantageously adapted to the natural oscillation or natural frequency of the bubble oscillations during bubble boiling. Advantageously, the period 1/f of the heating voltage can therefore be in the range between 5 ms and 50 ms, further advantageously between 10 ms and 40 ms, still further advantageously between 15 ms and 30 ms, and for example 20 ms. Depending on the composition of the vaporized liquid 50, frequencies other than those mentioned can be optimally adapted to the natural oscillation or natural frequency of the bubble oscillations.

Furthermore, it has been found that the maximum heating current generated by the heating voltage Uh should preferably be no more than 7 A, further preferably no more than 6.5 A, still further preferably no more than 6 A, and optimally in the range between 4 A and 6 A, in order to ensure concentrated vapor while avoiding overheating.

The feed rate of the wick structure 19 is again optimally adapted to that of the vaporization rate of the vaporizer 60, so that sufficient liquid 50 can be refed at any time and running empty of the region in front of the vaporizer 60 is avoided.

The vaporizer device 1 is preferably based on MEMS technology, in particular made of silicon, and is therefore advantageously a micro-electro-mechanical system.

According to the above, a structure is advantageously proposed consisting of a Si-based vaporizer 60, which is advantageously planar at least on the inlet side 61, and one or more underlying capillary structures 19 with advantageously different pore sizes. The wick structure 19 arranged directly on the inlet side 61 of the vaporizer 60 prevents the formation of bubbles on the inlet side 61 of the vaporizer 60, since gas bubbles prevent a further feeding effect and at the same time lead to (local) overheating of the vaporizer 60 due to a lack of cooling by liquid flowing in.

Figure 3:
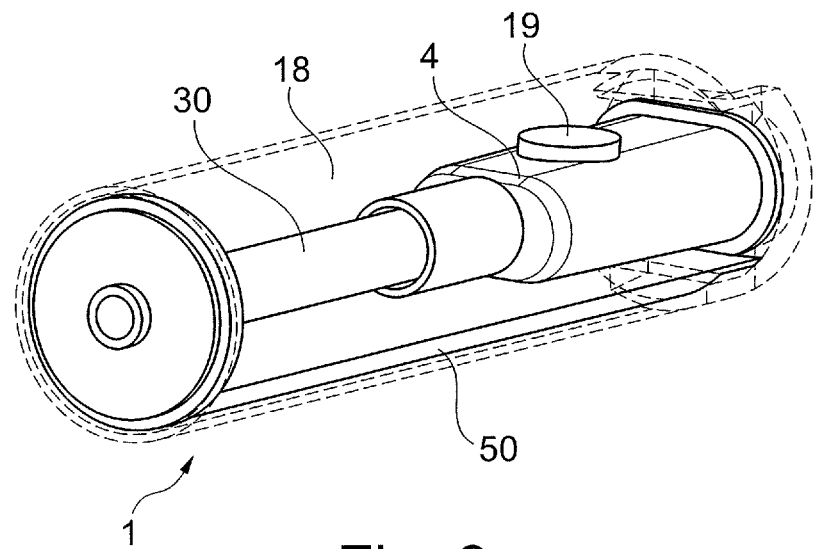
FIG. 3 a vaporizer tank unit according to the prior art.

FIG. 3 shows a vaporizer tank unit 1 according to the prior art. The vaporizer tank unit 1 comprises a liquid reservoir 18 for storing liquid 50, a carrier 4 and a wick structure 19. The carrier 4 holds a vaporizer 60, not shown, which is connected to the wick structure 19 on an inlet side 61 of the vaporizer 60 in a liquid-conducting manner. At an outlet side 64 of the vaporizer 60 opposite the inlet side 61, the vaporizer 60 can add the vaporized liquid 50 as a vapor and/or aerosol to an air stream 34 flowing through an air channel 30.

However, the cylindrical wick structure 19 may fall dry as shown in FIG. 3, i.e., the wick structure 19 may lack a supply of liquid 50 if the liquid reservoir 18 is not completely filled with liquid 50 and/or the vaporizer tank unit 1 is oriented such that the liquid 50 does not reach the wick structure 19 due to gravity. This may result in a lack of liquid at the vaporizer 60. For example, a critical condition is one in which the wick structure 19 is "up" when the inhaler 10 is oriented horizontally, but a residual liquid 50 is only "down" in the liquid reservoir 18, as shown in FIG. 3.

Figure 4:
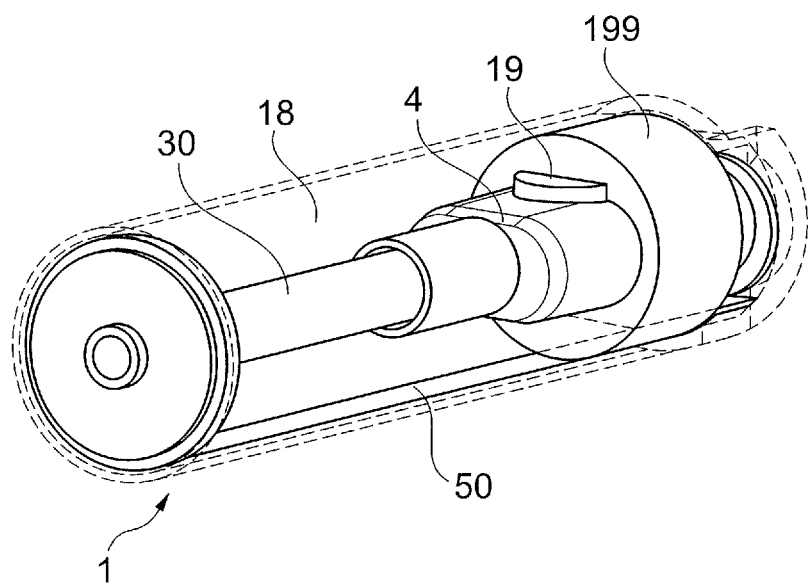
FIG. 4 a vaporizer tank unit with a sponge according to the prior art.

FIG. 4 shows a vaporizer tank unit 1 with a sponge 199 or an absorbent element, impregnated substrate or hydroscopic pad according to the prior art for reducing the risk of a lack of liquid at the wick structure 19 and/or at the vaporizer 60. The vaporizer tank unit 1 differs from the embodiment shown in FIG. 3 by the sponge 199. The sponge 199 is a component separate from the wick structure 19, which is connected to the wick structure 19 in a liquid-conducting manner. However, the connection of the wick structure 19 and the sponge 199 is complex and prone to errors.

Figure 5:
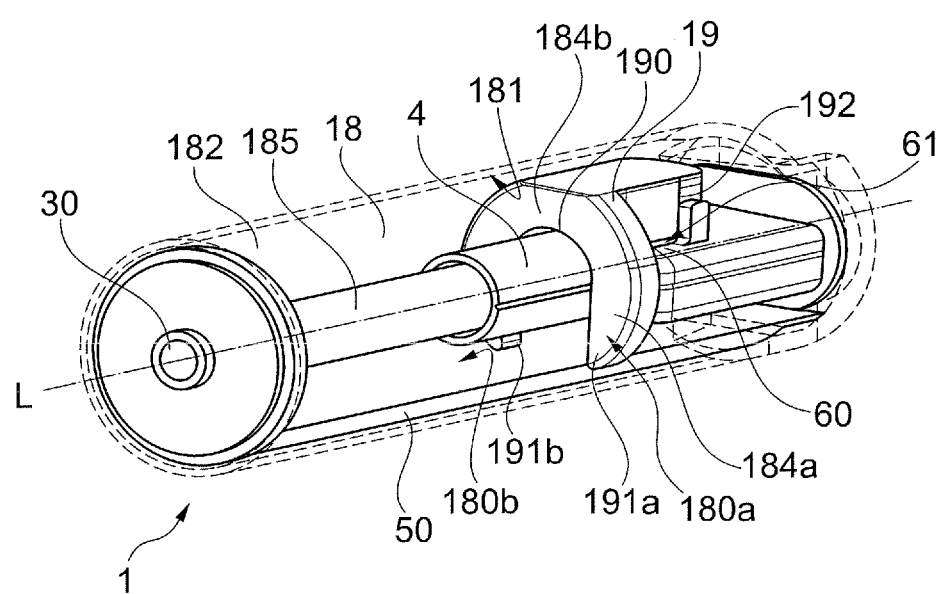
FIG. 5 a perspective view of a vaporizer tank unit according to the invention.

FIG. 5 shows a perspective view of a vaporizer tank unit 1 according to the invention. The vaporizer tank unit 1 comprises a vaporizer 60, which is held by a carrier 4, a liquid reservoir 18 for storing liquid 50 and a capillary wick structure 19, wherein liquid 50 is feedable by capillary forces from the liquid reservoir 18 to an inlet side 61 of the vaporizer 60.

The fluid reservoir 18 stores the liquid 50 in a volume bounded by an outer wall 182. The liquid reservoir 18 and/or the outer wall 182 of the liquid reservoir 18 may be, for example, a plastic and/or a coated, painted and/or surface-treated glass.

The liquid reservoir 18 comprises a longitudinal axis L. Along or parallel to the longitudinal axis L is an air channel 30 extending through the fluid reservoir 18. The air channel 30 is arranged within the fluid reservoir 18. The air channel 30 forms an inner wall 185 of the fluid reservoir 18. Thus, the liquid reservoir 18 stores liquid 50 between the inner wall 185 or the air channel 30 and the outer wall 182. The air channel 30 may, for example, be formed together with the carrier 4 or with parts of the carrier 4 as a one-piece vaporizer insert, for example made of plastic, for insertion into the vaporizer tank unit 1.

The vaporizer 60 comprises an outlet side 64 arranged such that the vaporizer 60 can add vaporized liquid 50 as a vapor and/or aerosol to an air stream 34 flowing through the air channel 30. For example, the outlet side 64 may face the air channel 30 or the longitudinal axis L of the liquid reservoir 18 if the vaporizer 60 is arranged radially spaced from the longitudinal axis L, as shown here by way of example.

Advantageously, the fluid reservoir 18 is most extended along the longitudinal axis L. The fluid reservoir 18 comprises, at least in sections, rotational symmetry about the longitudinal axis L. In this embodiment, the fluid reservoir 18 comprises a rotationally symmetrical section between an end face and the carrier 4.

The wick structure 19 is one-piece and is adapted to feed liquid 50 to the vaporizer 60 regardless of the orientation of the vaporizer tank unit 1, in that the wick structure 19 contacts the liquid reservoir 18 via a circumferential section 180a, 180b of the liquid reservoir 18. For this purpose, the wick structure 19 contacts the liquid reservoir 18 along an inner surface 181 of the outer wall 182 of the liquid reservoir 18. Contacting the circumferential section 180a, 180b ensures that the wick structure 19 can receive liquid 50 and pass it on to the vaporizer 60 regardless of the liquid level in the liquid reservoir 18.

The wick structure 19 extends in two diametrical directions perpendicular to the longitudinal axis L. In this embodiment, the wick structure 19 extends upwardly from the vaporizer 60 on one side in this embodiment and downwardly on the other side. The wick structure 19 comprises the two wick sections 191a, 191b separated from each other and contacting different sub-sections of the circumferential section 180a, 180b. In particular, the wick sections 191a, 191b project into different regions of the liquid reservoir 18 that are separated from each other, thereby improving the supply of liquid 50 to the vaporizer 60.

The wick structure 19 comprises a U-shaped or horseshoe cross-section with an apex 190. The wick structure 19 is arranged such that the wick structure 19 contacts the inlet side 61 of the vaporizer 60 at its apex 190. At the wick sections 191a, 191b remote from the apex 190 and separated from each other, the wick structure 19 contacts the liquid reservoir 18 in the circumferential section 180a, 180b. The U-shape of the wick structure 19 allows the wick structure 19 to be extended far into the fluid reservoir 18, in that the free ends or wick sections 191a, 191b of the wick structure 19 remote from the apex 190 hug the vaporizer 60. In this way, a liquid-conducting connection of the vaporizer 60 is obtained even with regions of the fluid reservoir 18 remote from the vaporizer 60 without limiting the assembly capability.

In this embodiment, the circumferential section 180a, 180b comprises two connected sub-sections, wherein a first sub-section is associable with the first wick section 191a and a second sub-section is associable with the second wick section 191b. In this embodiment, the circumferential section 180a, 180b comprises an angle of more than 180°, for example about 270°. Thus, the wick structure 19 connects the inlet side 61 of the vaporizer 60 to the liquid 50 stored in the liquid reservoir 18 in a liquid-conducting manner and independently of the orientation or filling level of the liquid reservoir 18.

The wick structure 19 extends from the electric vaporizer 60 into the liquid reservoir 18 and comprises a pore volume per pore that increases with distance from the vaporizer 60. The wick structure 19 comprises a storage section 184a and a feed section 184b, wherein in particular the feed section 184 may comprise smaller pores than the storage section 184a, which may serve as a liquid buffer. The feed section 184b is the section of the wick structure 19 contacting the inlet side 61 of the vaporizer 60, which feeds the liquid 50 to the vaporizer 60. The storage section 184a is the section of the wick structure 19 projecting into the liquid storage 18. In this example, the storage section 184a is formed by the wick sections 191a, 191b and the free ends of the wick structure 19, respectively. The volume of the storage section 184a is larger than the volume of the feed section 184b adjacent to the vaporizer 60. The feed section 184b is arranged in the region of the apex 190.

The wick structure comprises a mechanical retainer 192. The mechanical retainer 192 has various functions in the embodiment shown in FIG. 5. The mechanical retainer 192 can be used to secure the wick structure 19 to the carrier 4. This allows the wick structure 19 and/or the carrier 4 to be retained by the wick structure 19 within the vaporizer tank unit 1 in a non-displaceable manner. The retainer 192 may serve to retain the vaporizer 60.

Advantageously, the wick structure 19 is made of a porous glass, for example a borosilicate glass. The wick structure 19 is advantageously colored to improve the detectability of the filling level of the liquid reservoir 18.

Figure 6:
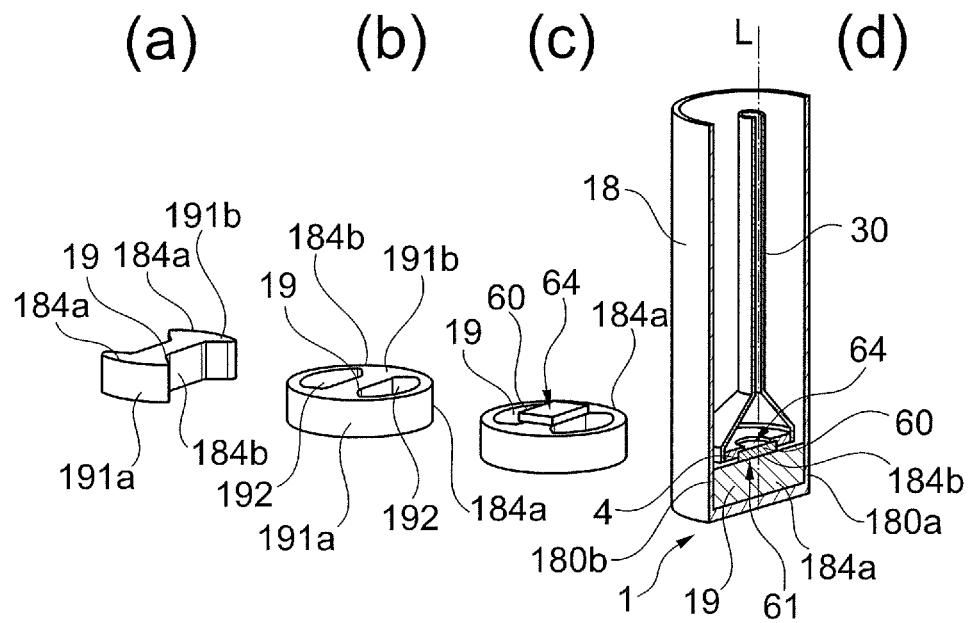
FIG. 6 a sectional view of a vaporizer tank unit according to the invention and several embodiments of a wick structure according to the invention.

FIG. 6 shows a sectional view of an vaporizer tank unit 1 according to the invention and several embodiments of a one-piece wick structure 19 according to the invention. From left to right, the figure shows twice each a wick structure 19 (a), (b), a wick structure 19 with a vaporizer 60(c) and a vaporizer tank unit 1(d).

The left wick structure 19 in FIG. 6(a) comprises a bone shape, i.e. the wick structure 19 comprises a centrally arranged feed section 184b and in this example two oppositely arranged wick sections 191a, 191b. In this example, the wick sections 191a, 191b are connected to each other only via the centrally arranged feed section 184b. The wick sections 191a, 191b form two separate storage sections 184a. Thus, the wick structure 19 is adapted to contact a liquid reservoir 18 in two separate circumferential sections 180a, 180b, see the vaporizer tank unit 1 in FIG. 6(d). In particular, the wick structure 19 comprises a circular circumference and can therefore contact a circumferential section 180a, 180b, preferably the inner surface 181 of a liquid reservoir 18 having a circular cross-section. In the assembled state, the inlet side 61 of the vaporizer 60 contacts the central feed section 184b of the wick structure 19.

The wick structure 19 in FIG. 6(b) comprises a ring shape, i.e. the wick structure 19 is disc-shaped. The wick structure 19 comprises a centrally arranged feed section 184b and, in this example, a ring-shape wick section 191a, 191b, which is connected in a liquid-conducting manner to the ring-shape wick section 191a, 191b and storage section 184a, respectively, by two oppositely arranged webs extending radially from the feed section 184b to the ring-shape wick section 191a, 191b. The wick sections 191a, 191b form a interconnected storage section 184a. Thus, the wick structure 19 is adapted to contact a liquid reservoir 18 in a circumferential section 180a, 180b, see the vaporizer tank unit 1 in FIG. 6(d). In particular, the wick structure 19 comprises a circular circumference and can therefore fully contact a circumferential section 180a, 180b, preferably the inner surface 181 of a liquid reservoir 18 having a circular cross-section. In the assembled state, the inlet side 61 of the vaporizer 60 contacts the central feed section 184b of the wick structure 19.

The wick structure 19 in FIG. 6(b) comprises eccentric openings or recesses that form a retainer 192 of the wick structure 19. The retainer 192 may serve, for example, for retaining a carrier 4 and/or for retaining the wick structure 19 in the vaporizer tank unit 1. In this example, two recesses are provided, wherein any number may be provided, in particular 1, 3 to 10 recesses may be provided. The recesses are in the form of ring segments and may also be in the form of slots, for example.

The wick structure 19 with the vaporizer 60 according to FIG. 6(c) comprises the wick structure 19 explained with reference to FIG. 6(b). The inlet side 61 of the vaporizer 60 contacts the feed section 184b of the wick structure 19 in a planar and liquid-conducting manner. The outlet side 64 of the vaporizer 60 is arranged facing away from the wick structure 19.

As shown in the cross-sectional view of the vaporizer tank unit 1 in FIG. 6(d), the wick structure 19 contacts a liquid reservoir 18 via at least two spaced-apart circumferential sections 180a, 180b when a bone-shaped wick structure 19 as shown in FIG. 6(a) is used. Alternatively, the wick structure 19 may fully contact the liquid reservoir 18 in a circumferential section 180a, 180b when a ring-shaped wick structure 19 is used as shown in FIG. 6(b).

A vaporizer 60 contacts an inlet side 61 of a feed section 184b of the wick structure 19, and an outlet side 64 of the vaporizer 60 faces an air channel 30. The vaporizer is held by the carrier 4.

Figure 7:
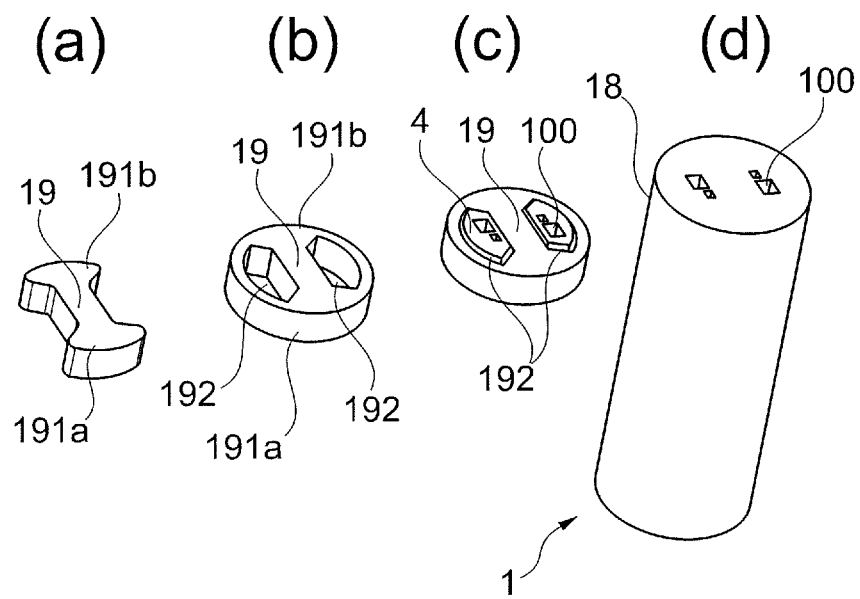
FIG. 7 a perspective view of a vaporizer tank unit according to the invention and several embodiments of a wick structure according to the invention.

FIG. 7 shows a perspective view of a vaporizer tank unit 1 according to the invention and several embodiments of a wick structure 19 according to the invention. From left to right, the figure shows twice each a wick structure 19(a), (b), a wick structure 19 with a carrier 4(c) and a vaporizer tank unit 1(d).

The wick structures 19 shown in FIGS. 7(a) and 7(b) are the wick structures 19 explained with reference to FIGS. 6(a) and 6(b) in a different perspective.

The wick structure 19 with the carrier 4 shown in FIG. 7(c) shows that the carrier 4 is held in the retainer 192 of the wick structure 19. The carrier 4 is designed in such a way that it can be inserted into the openings forming the retainer 192 and held there in such a way that it cannot be displaced.

As shown in FIGS. 7(c) and (d), the carrier 4 may comprise, for example, electrical contacts 100 which establish an electrical connection to the vaporizer 60 so that the vaporizer 60 can be electrically contacted and controlled by a part external with respect to the vaporizer tank unit 1.

FIG. 7(d) shows the vaporizer tank unit of FIG. 6(d) in another perspective. The liquid tank 18 forms the outer part of the vaporizer tank unit 1, which can be brought into electrical contact with an external part, for example a base part 16 of an inhaler 10, by means of the electrical contacts 100.

Figure 8:
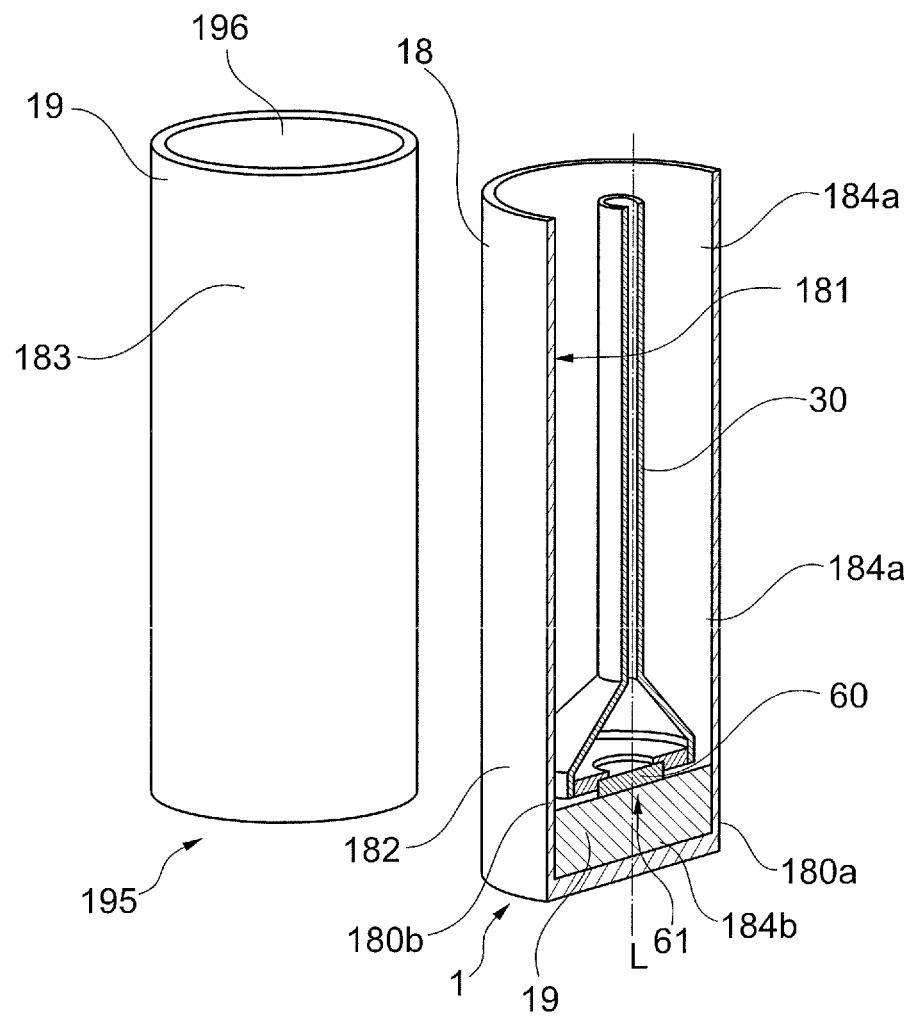
FIG. 8 a wick structure and a sectional view of a vaporizer tank unit according to the invention.

FIG. 8 shows on the left a wick structure 19 and on the right a sectional view of a vaporizer tank unit 1 according to one embodiment of the invention.

The wick structure 19 is partially hollow cylindrical with a longitudinal axis and comprises a radially extending feed section 184b on one end face 195. The hollow cylindrical wick structure 19 comprises a cavity 196 that can geometrically enclose and/or store liquid 50 in the liquid reservoir 18.

For example, the hollow cylindrical wick structure 19 may fully contact a cylindrical liquid tank 18 at a circumferential section 180a, 180b corresponding to an inner surface 181 of an outer wall 182 of the liquid reservoir 18. In this embodiment, the wick structure 19 may be made entirely of a porous material. The wick structure 19 may be inserted into a liquid reservoir 18, ensuring that liquid 50 is in connection with the wick structure 19 regardless of orientation or filling level.

Advantageously, the wick structure 19 forms the liquid reservoir 18. Further on, the wick structure 19 may comprise a liquid-tight outer wall 182, thereby forming the outer wall 182 of the liquid reservoir 18. This may eliminate the need for another component for storing liquid 50 that is separate from the wick structure 19 and that forms the liquid reservoir 18.

For example, the wick structure 19 may comprise a porous and pressed glass. Thus, the pore size and pore distribution can be precisely adjusted. The feed section 184b may comprise a larger number of pores with a smaller volume per pore than the storage section 184a. The storage section 184 may also have a pore size gradient, wherein the pore size decreases starting from the vaporizer 60 and/or, for example, the pore size is constant in the hollow cylindrical section of the wick structure 19. By painting and/or coating, for example, the outer wall 182 of the wick structure 19 can be sealed to the outside in a liquid-tight manner and itself create the liquid reservoir 18.

Advantageously, the wick structure 19 is colored, for example, in order to be able to detect the fill level of the liquid reservoir 18 and/or to increase the visual value. In this example, the vaporizer 60 is aligned with the inlet side 61 and an outlet side 64 perpendicular to the longitudinal axis L. However, in other embodiments, the inlet side 61 and/or the outlet side 64 may also be oriented parallel or angular to the longitudinal axis L.

An air channel 30 is provided coaxially about the longitudinal axis L, preferably concentric with the outer wall 182 of the liquid reservoir 18.

EMBODIMENTS

Embodiment 1. Vaporizer tank unit (1) for an electronic cigarette product (10), comprising
at least one electric vaporizer (60) for vaporizing liquid (50) fed to the vaporizer (60),
a liquid reservoir (18) for storing liquid (50), and
a capillary wick structure (19), wherein the liquid (50) is feedable by capillary forces from the liquid reservoir (18) to an inlet side (61) of the vaporizer (60), characterized in that
the wick structure (19) is one-piece and contacts and/or forms the liquid reservoir (18) over at least one circumferential section (180a, 180b).

Embodiment 2. Vaporizer tank unit (1) according to one of the preceding embodiments, characterized in that
the wick structure (19) contacts the liquid reservoir (18) along an inner surface (181) of an outer wall (182) of the liquid reservoir (18).

Embodiment 3. Vaporizer tank unit (1) according to any of the preceding embodiments, characterized in that
the liquid reservoir (18) comprises a longitudinal axis (L), and the wick structure (19) extends radially in at least two diametric directions perpendicular to the longitudinal axis (L).

Embodiment 4. Vaporizer tank unit (1) according to one of the preceding embodiments, characterized in that
an air channel (30) extending through the liquid reservoir (18) is provided in the liquid reservoir (18).

Embodiment 5. Vaporizer tank unit (1) according to one of the preceding embodiments, characterized in that
the wick structure (19) comprises a plurality of diverging and/or opposing wick sections (191a, 191b) contacting different circumferential sections (180a, 180b).

Embodiment 6. Vaporizer tank unit (1) according to one of the preceding embodiments, characterized in that the wick structure (19) comprises a U-shaped cross-section with an apex (190) and is arranged such that the wick structure (19) contacts the inlet side (62) at its apex (190).

Embodiment 7. Vaporizer tank unit (1) according to one of the preceding embodiments, characterized in that
the circumferential section (180a, 180b) comprises at least an angle of 45°.

Embodiment 8. Vaporizer tank unit (1) according to one of the preceding embodiments, characterized in that
the wick structure (19) comprises a mechanical retainer (192).

Embodiment 9. Vaporizer tank unit (1) according to one of the preceding embodiments, characterized in that
the wick structure (19) is at least partially hollow-cylindrical in shape.

Embodiment 10. Vaporizer tank unit (1) according to one of the preceding embodiments, characterized in that
the wick structure (19) at least partially forms the liquid reservoir (18).

Embodiment 11. Vaporizer tank unit (1) according to embodiment 10, characterized in that
the wick structure (19) forms an outer wall (182) of the liquid reservoir (18).

Embodiment 12. Vaporizer tank unit (1) according to any one of the preceding embodiments, characterized in that
the wick structure (19) extends from the electric vaporizer (60) into the liquid reservoir (18) and comprises a pore volume per pore increasing with distance from the vaporizer (60).

Embodiment 13. Vaporizer tank unit (1) according to one of the preceding embodiments, characterized in that
the wick structure (19) comprises a storage section (184a) and a feed section (184b), and
the volume of the storage section (184a) in the liquid reservoir (18) is greater than the volume of the feed section (184b) adjacent to the vaporizer (60).

Embodiment 14. Vaporizer tank unit (1) according to one of the preceding embodiments, characterized in that
the wick structure (19) comprises a painted, coated and/or liquid-tight surface (183).

Embodiment 15. Vaporizer tank unit (1) according to one of the preceding embodiments, characterized in that
the wick structure (19) consists of a porous glass.

Embodiment 16. Vaporizer tank unit (1) according to one of the preceding embodiments,
characterized in that
the wick structure (19) is colored.

Embodiment 17. Electronic cigarette product (10) comprising a vaporizer tank unit (1) according to any one of the preceding embodiments.

Embodiment 18. Wick structure (19) for an electronic cigarette product (10), characterized in that
the wick structure (19) is one-piece and consists of a porous glass.

The invention claimed is:

1. A vaporizer tank unit for an electronic cigarette product, comprising:
an electric vaporizer for vaporizing liquid fed to the electric vaporizer, wherein the vaporizer comprises a plurality of microchannels that liquidly connect an inlet side of the vaporizer to an outlet side of the vaporizer;
a liquid reservoir for storing liquid;
a capillary wick structure;
wherein the liquid is feedable by capillary forces from the liquid reservoir to an inlet side of the electric vaporizer;
wherein the wick structure is one-piece and contacts and/or forms the liquid reservoir over at least one circumferential section of the liquid reservoir and wherein the wick structure comprises a U-shaped cross-section with an apex and is arranged such that the wick structure contacts the inlet side of the vaporizer at the apex of the wick structure;
wherein the wick structure comprises a mechanical retainer;
wherein the mechanical retainer serves for retaining a carrier holding the vaporizer and/or for retaining the wick structure in the vaporizer tank unit;
wherein the wick structure has a ring shape and comprises a centrally arranged feed section and a ring-shape wick section;
wherein the ring-shape wick section is connected in a liquid-conducting manner to the ring-shape wick section by webs extending radially from the feed section to the ring-shape wick section,
the wick structure comprises eccentric openings or recesses that form the retainer,
and wherein the inlet side of the vaporizer is connected to the liquid reservoir via the wick structure in a liquid conducting manner, the wick structure contacts the inlet side of the vaporizer, and the vaporizer vaporizes liquid, which is fed to the vaporizer from the liquid reservoir by the wick structure by means of capillary forces, and adds the vaporized liquid as an aerosol or vapor to an air flow in an air channel at the outlet side of the vaporizer.

2. The vaporizer tank unit according to claim 1,
wherein the capillary wick structure contacts the liquid reservoir along an inner surface of an outer wall of the liquid reservoir.

3. The vaporizer tank unit according to claim 1,
wherein the liquid reservoir comprises a longitudinal axis (L), and the capillary wick structure extends radially in at least two diametric directions perpendicular to the longitudinal axis (L).

4. The vaporizer tank unit according to claim 1,
wherein an air channel extending through the liquid reservoir is provided in the liquid reservoir.

5. Vaporizer tank unit according to claim 1,
wherein the wick structure comprises a plurality of diverging and/or opposing wick sections contacting different circumferential sections of the liquid reservoir.

6. The vaporizer tank unit according to claim 1,
wherein one or more circumferential sections of the at least one circumferential section comprises at least an angle of 45°.

7. The vaporizer tank unit according to claim 1,
wherein the wick structure is at least partially hollow-cylindrical in shape.

8. The vaporizer tank unit according to claim 1,
wherein the wick structure at least partially forms the liquid reservoir.

9. The vaporizer tank unit according to claim 8,
wherein the wick structure forms an outer wall of the liquid reservoir.

10. The vaporizer tank unit according to claim 1,
wherein the wick structure extends from the electric vaporizer into the liquid reservoir and comprises a pore volume per pore increasing with distance from the vaporizer.

11. The vaporizer tank unit according to claim 1, wherein the wick structure comprises a storage section and a feed section, and wherein a volume of the storage section in the liquid reservoir is greater than a volume of the feed section adjacent to the vaporizer.

12. The vaporizer tank unit according to claim 1, wherein the wick structure comprises a painted and/or coated surface.

13. The vaporizer tank unit according to claim 1, wherein the wick structure consists of a porous glass.

14. The vaporizer tank unit according to claim 1, wherein the wick structure is colored.

15. An electronic cigarette product comprising a vaporizer tank unit according to claim 1.

16. A wick structure for an electronic cigarette product, wherein the wick structure is one-piece and consists of a porous glass.

17. The vaporizer tank unit according to claim 1, wherein the wick structure comprises a liquid-tight surface.

18. The vaporizer tank unit according to claim 1, wherein the vaporizer is block-shaped and made of an electrically conductive material.

19. The vaporizer tank unit according to claim 18, wherein the vaporizer is made of silicon.

* * * * *